(12) United States Patent
Zhang

(10) Patent No.: US 8,478,895 B2
(45) Date of Patent: Jul. 2, 2013

(54) CONTENT ADAPTATION REALIZING METHOD AND CONTENT ADAPTATION SERVER

(75) Inventor: Jian Zhang, Shenzhen (CN)

(73) Assignee: ZTE Corporation, Shenzhen (CN)

(*) Notice: Subject to any disclaimer, the term of this patent is extended or adjusted under 35 U.S.C. 154(b) by 0 days.

(21) Appl. No.: 13/054,797

(22) PCT Filed: Jul. 30, 2009

(86) PCT No.: PCT/CN2009/072995
§ 371 (c)(1),
(2), (4) Date: Jan. 19, 2011

(87) PCT Pub. No.: WO2010/017741
PCT Pub. Date: Feb. 18, 2010

(65) Prior Publication Data
US 2011/0125864 A1    May 26, 2011

(30) Foreign Application Priority Data
Aug. 14, 2008 (CN) .......................... 2008 1 0146253

(51) Int. Cl.
*G06F 15/16* (2006.01)
*G06F 15/173* (2006.01)

(52) U.S. Cl.
USPC ....................... 709/236; 709/228; 709/247

(58) Field of Classification Search
USPC ........................ 709/227–228, 236, 246–247
See application file for complete search history.

(56) References Cited

U.S. PATENT DOCUMENTS

| | | | | |
|---|---|---|---|---|
| 6,345,279 | B1 * | 2/2002 | Li et al. .......................... | 709/217 |
| 7,171,190 | B2 * | 1/2007 | Ye et al. ......................... | 709/206 |
| 7,609,686 | B1 * | 10/2009 | McNamara et al. .......... | 709/206 |

(Continued)

FOREIGN PATENT DOCUMENTS

| CN | 1867125 A | 11/2006 |
|---|---|---|
| CN | 101150757 A | 3/2008 |

(Continued)

OTHER PUBLICATIONS

Majid Ghaderi and Srinivasan Keshav, Multimedia Messaging Service: System Description and Performance Analysis, in Proceedings of IEEE/ACM Wireless Internet Conference WICON, Jul. 2005, pp. 198-205.*

(Continued)

*Primary Examiner* — Patrice Winder
(74) *Attorney, Agent, or Firm* — Oppedahl Patent Law Firm LLC

(57) ABSTRACT

The present invention discloses a method for realizing content adaptation and a content adaptation server, the method includes: receiving a multimedia message from a calling terminal, wherein contents of the multimedia message and a model of a called terminal are included in the multimedia message; determining the multimedia formats supported by the called terminal according to the model of the called terminal, and selecting an optimum multimedia format from them; and compressing the multimedia message according to the selected optimum multimedia format, and sending the compressed multimedia message according to the maximum size of the multimedia message supported by the called terminal. Based on the present invention, the presentation effect of the contents of the multimedia message can be enhanced and the user experience can be improved by selecting the optimum multimedia format to compress the multimedia message according to the model of the called terminal.

13 Claims, 3 Drawing Sheets

U.S. PATENT DOCUMENTS

| | | | |
|---|---|---|---|
| 2001/0010685 A1* | 8/2001 | Aho | 370/401 |
| 2005/0190269 A1 | 9/2005 | Grignani | |
| 2005/0233758 A1* | 10/2005 | Salmi | 455/466 |
| 2006/0019636 A1* | 1/2006 | Guglielmi et al. | 455/412.1 |
| 2007/0011256 A1* | 1/2007 | Klein | 709/206 |
| 2007/0255792 A1* | 11/2007 | Gronberg | 709/206 |
| 2008/0305773 A1* | 12/2008 | Hundscheidt et al. | 455/412.1 |
| 2009/0125677 A1* | 5/2009 | Leveque et al. | 711/113 |
| 2009/0216840 A1* | 8/2009 | Pajunen et al. | 709/206 |
| 2009/0286558 A1* | 11/2009 | Zufi et al. | 455/466 |
| 2010/0153488 A1* | 6/2010 | Mittal et al. | 709/203 |

FOREIGN PATENT DOCUMENTS

| | | |
|---|---|---|
| CN | 101222682 A | 7/2008 |
| CN | 101345776 A | 1/2009 |
| EP | 1835768 A1 | 9/2007 |
| WO | WO 03/005276 A2 * | 1/2003 |
| WO | 2006066450 A1 | 6/2006 |

OTHER PUBLICATIONS

Stephen Coulombe et al., Chapter 7: Content Adaptation for the Mobile Internet, of Content Networking in the Mobile Internet, edited by Sudhir dixit and Tao Wu, Jan. 2005, pp. 254, retrieved from http://onlinelibrary.wiley.com/doi/10.1002/047147827X.ch7/pdf on Mar. 19, 2012.*

Notification of the First Office Action of Chinese application No. 200810146253.4, issued on Aug. 6, 2010.

Notification of the Second Office Action of Chinese application No. 200810146253.4, issued on May 6, 2011.

International Search Report on international application No. PCT/CN2009/072995, mailed on Nov. 12, 2009.

English Translation of the Written Opinion of the International Search Authority in international application No. PCT/CN2009/072995, mailed on Nov. 12, 2009.

* cited by examiner

CONTENT ADAPTATION REALIZING METHOD AND CONTENT ADAPTATION SERVER

TECHNICAL FIELD

The present invention relates to the field of communications, and specifically to a method for realizing content adaptation and a content adaptation server.

BACKGROUND

Along with the development of communication technologies, types and functions of terminals become increasingly complex and diverse, different terminals have different capabilities, and their abilities to support multimedia messages are different as well.

In view of the issue that different terminals have different capabilities of supporting the multimedia messages, a multimedia message content adaptation server has been produced, wherein the process of using the multimedia message content adaptation server to adapt the messages is: forwarding the multimedia message sent by a calling terminal to a called terminal, while the called terminal acquires the multimedia message, a multimedia message center sends the multimedia message and a terminal type of the called terminal to the multimedia message content adaptation server; according to the capability of the terminal, the multimedia message content adaptation server adapts contents of the multimedia message, and returns the adapted multimedia message to the multimedia message center; the multimedia message center receives the adapted multimedia message, and delivers the adapted multimedia message to the called terminal.

When the multimedia message content adaptation server is used to adapt messages, the contents of the multimedia message may be compressed and converted, this may result in a poor presentation effect of the contents of the multimedia message, and reduce the user experience of the called terminal about the multimedia message.

SUMMARY

The present invention is proposed in consideration of the poor presentation effect of contents of multimedia messages and an impact on the user experience that may result from using a multimedia message content adaptation server to compress and convert contents of the multimedia messages in related technologies, for this reason, the main purpose of the present invention is to provide a method for realizing content adaptation and a content adaptation server so as to resolve the above-mentioned problem.

Based on one aspect of the present invention, the method for realizing content adaptation is provided.

The method for realizing content adaptation in accordance with the present invention includes: receiving a multimedia message from a calling terminal, wherein contents of the multimedia message and a model of a called terminal are included in the multimedia message; determining multimedia formats supported by the called terminal according to the model of the called terminal, and selecting an optimum multimedia format from them; and compressing the multimedia message according to the selected optimum multimedia format, and sending the compressed multimedia message according to the maximum size of the multimedia message supported by the called terminal.

Wherein the processing of compressing the multimedia message may specifically include: according to a multimedia type, the received contents of the multimedia message are divided into different types of multimedia message content segments, wherein the multimedia type includes pictures, audios, videos and texts; and different types of the multimedia message content segments are compressed respectively, and individual compressed multimedia message content segments are assembled into the compressed multimedia message.

Moreover, the operation of sending the compressed multimedia message according to the maximum size of the multimedia message supported by the called terminal may specifically include: if the size of the compressed multimedia message is smaller than or equal to the maximum size of the multimedia message supported by the called terminal, then the compressed multimedia message is sent directly; and if the size of the compressed multimedia message is greater than the maximum size of the multimedia message supported by the called terminal, then the compressed multimedia message is divided into multiple sub-multimedia-messages, wherein the size of each sub-multimedia-message is all smaller than or equal to the maximum size of the multimedia message supported by the called terminal.

Furthermore, the method may also include: a multimedia message center receives the compressed multimedia message; the multimedia message center decomposes the compressed multimedia message; in the case that one multimedia message is obtained through decomposition, the multimedia message center directly sends the multimedia message obtained through decomposition to the called terminal; and in the case that multiple sub-multimedia-messages are obtained through decomposition, the multimedia message center sends one sub-multimedia-message to the called terminal, and locally saves the rest sub-multimedia-messages to be used for subsequent sending.

Wherein, the processing of locally saving the rest sub-multimedia-messages to be used for subsequent sending may specifically include: after receiving a message acknowledgement response from the called terminal, the multimedia message center sends another sub-multimedia-message to the called terminal.

Based on another aspect of the present invention, the content adaptation server is provided.

The content adaptation server in accordance with the present invention comprises: a receiving module, which is used for receiving a multimedia message from a calling terminal, wherein multimedia contents and a model of a called terminal are included in the multimedia message; a determining module, which is used for determining multimedia formats supported by the called terminal according to the model of the called terminal and selecting an optimum multimedia format from them; a compressing module, which is used for compressing the multimedia message according to the optimum multimedia format selected by the determining module; and a sending module, which is used for sending the multimedia message compressed by the compressing module according to the maximum size of the multimedia message supported by the called terminal.

Preferably, the compressing module may comprise: a splitting module, which is used for dividing the received contents of the multimedia message into different types of multimedia message content segments according to a multimedia type, wherein the multimedia type includes pictures, audios, videos and texts; a compressing sub-module, which is used for compressing the different types of the multimedia message content segments; and an assembling module, which is used for assembling individual compressed multimedia message content segments into the compressed multimedia message.

Moreover, the sending module may comprise: a first sending module, which is used for directly sending the compressed multimedia message if the size of the compressed multimedia message is smaller than or equal to the maximum size of the multimedia message supported by the called terminal; and a second sending module, which is used for dividing the compressed multimedia message into multiple sub-multimedia-messages and sending them if the size of the compressed multimedia message is greater than the maximum size of the multimedia message supported by the called terminal, wherein the size of each sub-multimedia-message is all smaller than or equal to the maximum size of the multimedia message supported by the called terminal.

Based on at least one of the above-mentioned technical schemes of the present invention, the presentation effect of the contents of the multimedia message can be enhanced and the user experience can be improved by selecting the optimum multimedia format to compress the multimedia message according to the model of the called terminal.

BRIEF DESCRIPTION OF THE DRAWINGS

The drawings are used to provide further understanding about the present invention, constitute a part of the description, are used together with the embodiments of the present invention to explain the present invention, and do not constitute any limitation to the present invention. Among the drawings.

DETAILED DESCRIPTION

The present invention will be described in details with reference to the drawings hereinafter. It is necessary to be noted that when there is no conflict, embodiments in the present application and the characteristics in the embodiments can be combined with each other.

Method Embodiment

In accordance with the embodiments of the present invention, a method for realizing content adaptation is provided.

Figure 1:
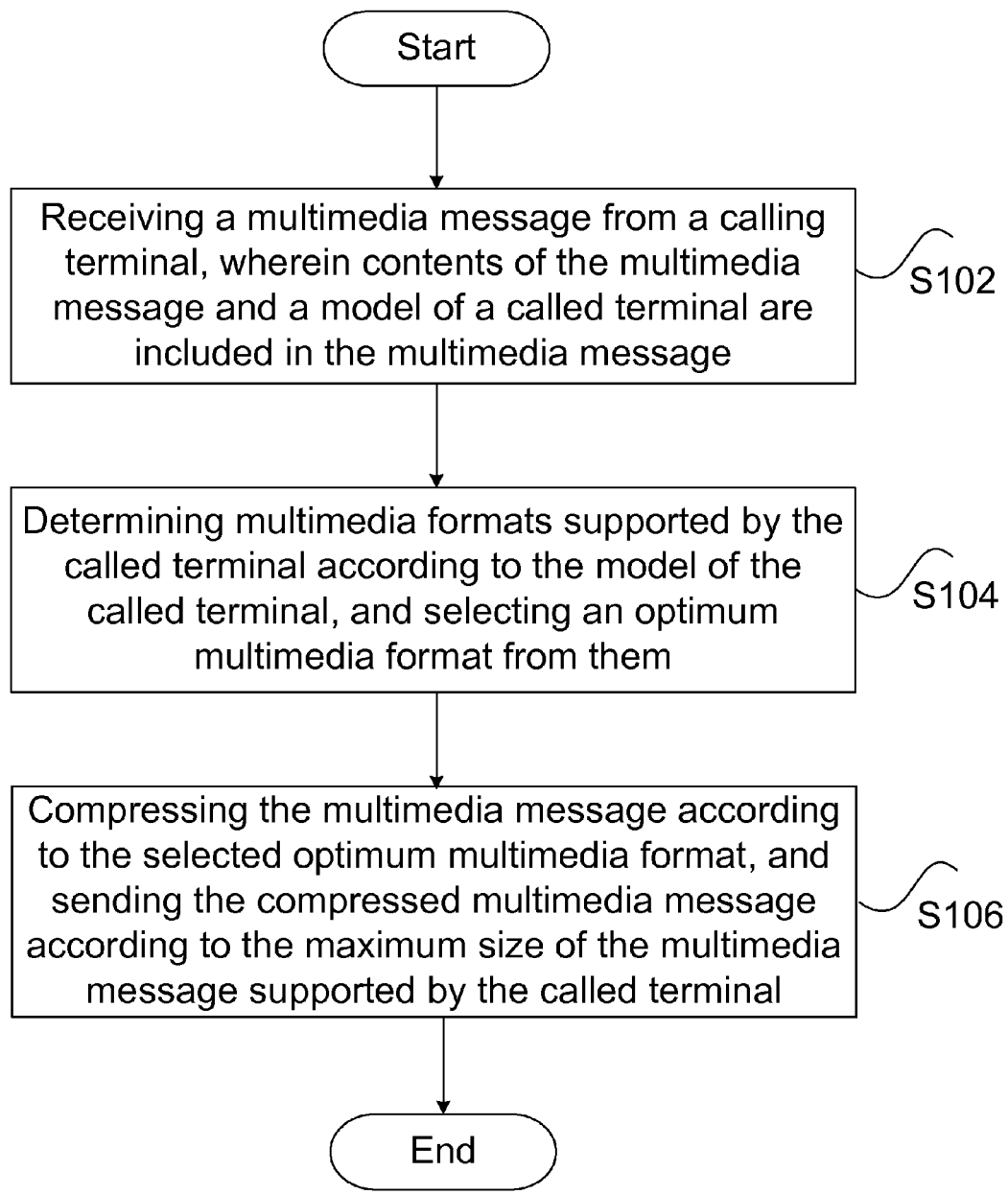
FIG. 1 is a flowchart of a method for realizing content adaptation in accordance with a method embodiment of the present invention.

FIG. 1 is a flowchart of the method for realizing content adaptation in accordance with the embodiment of the present invention, as shown in FIG. 1, the method includes the following step S102 to step S106:

step S102, receiving a multimedia message from a calling terminal, wherein contents of the multimedia message and a model of a called terminal are included in the multimedia message;

step S104, determining multimedia formats supported by the called terminal according to the model of the called terminal, and selecting an optimum multimedia format from them; and step S106, compressing the multimedia message according to the selected optimum multimedia format, and transmitting the compressed multimedia message according to the maximum size of the multimedia message supported by the called terminal.

Wherein in step S106, the operation of compressing the multimedia message specifically includes: according to multimedia types, the received contents of multimedia message are divided into different types of multimedia message content segments, wherein the multimedia type includes pictures, audios, videos and texts; different types of the multimedia message content segments are compressed respectively, and individual compressed multimedia message content segments are assembled into the compressed multimedia message.

Wherein in step S106, the operation of sending the compressed multimedia message according to the maximum size of the multimedia message supported by the called terminal specifically includes: if the size of the compressed multimedia message is smaller than or equal to the maximum size of the multimedia message supported by the called terminal, then the compressed multimedia message is sent directly; and if the size of the compressed multimedia message is greater than the maximum size of the multimedia message supported by the called terminal, then the compressed multimedia message is divided into multiple sub-multimedia-messages, wherein the size of each sub-multimedia-message is all smaller than or equal to the maximum size of the multimedia message supported by the called terminal. The multimedia message is compressed by selecting the optimum multimedia format, to enhance the presentation effect of contents of the multimedia message.

Preferably, the method further includes: a multimedia message center receives the compressed multimedia message, and decomposes the compressed multimedia message, in the case that one multimedia message is obtained through decomposition, the multimedia message center directly sends the multimedia message obtained through decomposition to the called terminal; in the case that multiple sub-multimedia-messages are obtained through decomposition, it sends one sub-multimedia-message to the called terminal and locally saves the rest sub-multimedia-messages to be used for subsequent sending, wherein the multimedia message center can send the rest subsequent sub-multimedia-messages to the called terminal after receiving a message acknowledgement response from the called terminal.

Figure 2:
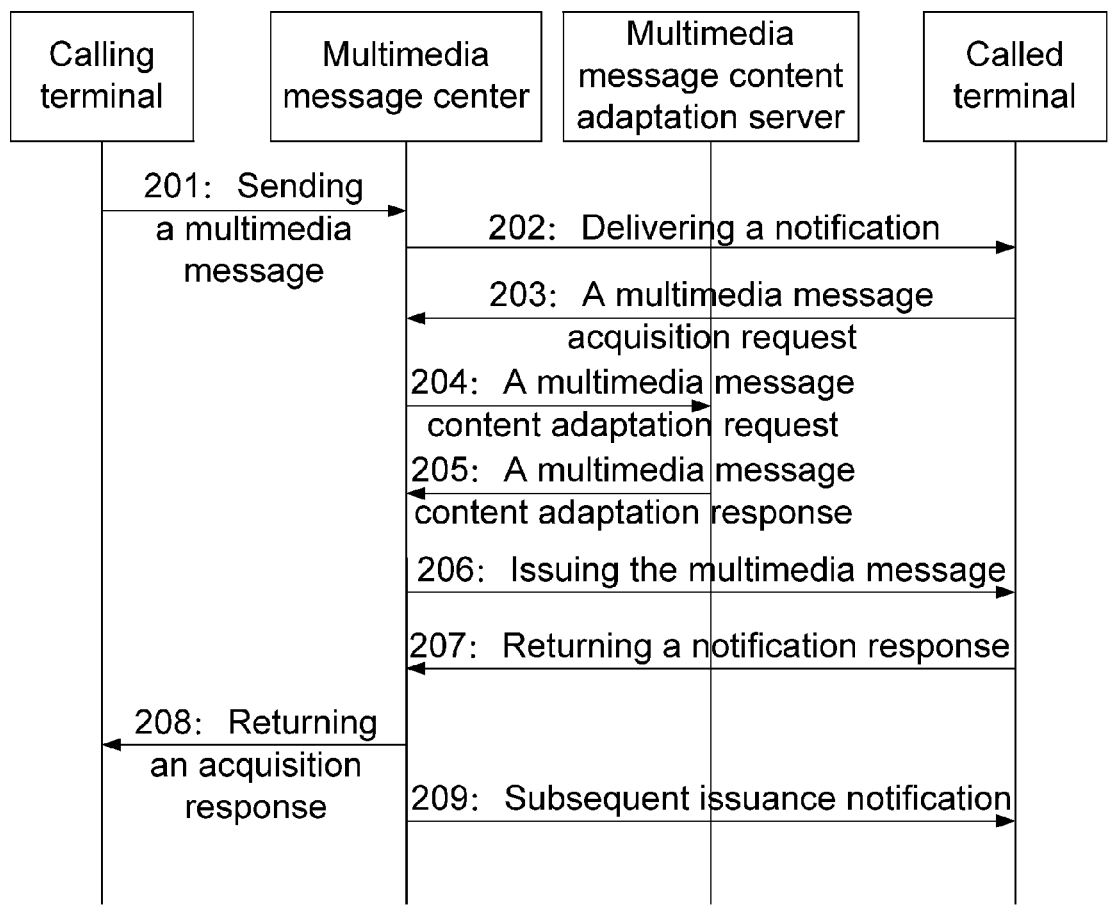
FIG. 2 is a detailed processing flowchart of the method for realizing content adaptation in accordance with the method embodiment of the present invention.

FIG. 2 is a detailed processing flowchart of the method for realizing content adaptation in accordance with the method embodiment of the present invention, as shown in FIG. 2, the method includes the following step S201 to step S209:

step S201, the multimedia message center acquires a multimedia message sent by the calling terminal or an SP server, wherein the contents of the multimedia message and a model of the called terminal are included in the multimedia message, the multimedia message center saves the contents of the multimedia message in a data memory and records an address that saves the contents of the multimedia message;

step S202, the multimedia message center sends a notification message to a user of the called terminal, the address that saves the contents of the multimedia message is included in the notification message, and the notification message may be delivered through a short message;

step S203, the called terminal initiates a multimedia message acquisition request to the multimedia message center according to the contents of the notification message;

step S204, after receiving the acquisition request from the called terminal, the multimedia message center retrieves terminal information of the called terminal, and sends the contents of the entire multimedia message and a terminal type of a called user to the multimedia message content adaptation server;

step S205, according to the multimedia type, the multimedia message content adaptation server divides the entire received contents of the multimedia message into different types of multimedia message content segments, wherein the multimedia type includes pictures, audios, videos and texts, selects the multimedia format supported by the called terminal from a local terminal database according to the model of the called terminal, selects a content adaptation method that offers the best presentation effect according to capabilities of the called terminal, respectively compresses different types of the multimedia message content segments, and assembles the individual compressed multimedia message content segments into the compressed multimedia message;

if the size of the contents of the compressed multimedia message is smaller than or equal to the maximum size of the multimedia message supported by the called terminal, then the compressed multimedia message is returned to the multimedia message center as an adapted result;

if the size of the contents of the compressed multimedia message is greater than the maximum size of the multimedia message supported by the called terminal, then the multimedia message is divided into multiple sub-multimedia-messages, and the multiple sub-multimedia-messages are returned to the multimedia message center as the adapted result;

step S206, the multimedia message center receives the adapted result and decomposes the message, if only one multimedia message is obtained through decomposition, then the multimedia message is directly returned to the called terminal; if multiple sub-multimedia-messages are obtained through decomposition, then a first decomposed sub-multimedia-message is returned to the called terminal, the rest sub-multimedia-messages are saved in the multimedia message center, waiting for subsequent sending;

step S207, after acquiring the multimedia message or the first sub-multimedia-message, the called terminal returns a multimedia message success response (i.e. the above mentioned message acknowledgement response) to the multimedia message center;

step S208, the multimedia message center receives the multimedia message success response, and completes the sending acknowledgement of the multimedia message;

step S209, if there are other sub-multimedia-messages, then the multimedia message center continues to deliver the sub-multimedia-messages to the called terminal according to the order of sequence, and the called terminal continues to acquire the sub-multimedia-messages delivered by the multimedia message center.

Based on the technical scheme provided in the embodiments of the present invention, the presentation effect of the contents of the multimedia message can be enhanced and the user experience can be improved by selecting the optimum multimedia format to compress the multimedia message according to the model of the called terminal.

In accordance with the embodiments of the present invention, a computer-readable media is also provided; the computer-readable media saves a computer-executable command. When the command is executed by a computer or processor, the computer or processor executes processing in individual steps as shown in FIG. 1 and FIG. 2, and preferably, it executes the above-mentioned method embodiment.

Device Embodiment

Figure 3:
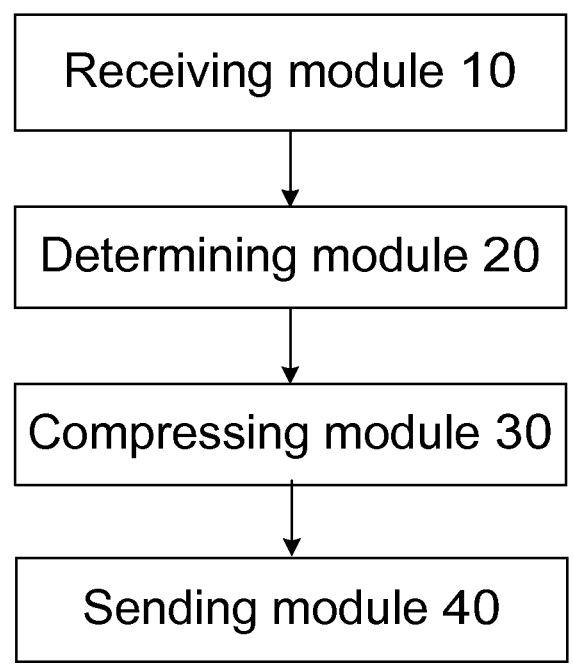
FIG. 3 is a structure block diagram of a content adaptation server in accordance with the method embodiment of the present invention.

Based on embodiments of the present invention, a content adaptation server is provided. FIG. 3 is a structure block diagram of the content adaptation server in accordance with the embodiments of the present invention, as shown in FIG. 3, the device comprises: a receiving module 10, a determining module 20, a compressing module 30, and a sending module 40. The functions of individual modules will be described in details hereinafter:

the receiving module 10 is used for receiving a multimedia message from a calling terminal, wherein multimedia contents and a model of a called terminal are included in the multimedia message;

the determining module 20 is used for determining multimedia formats supported by the called terminal according to the model of the called terminal and selecting an optimum multimedia format from them, and the determining module may be connected to the receiving module 10;

the compressing module 30 is used for compressing the multimedia message according to the optimum multimedia format selected by the determining module, and the compressing module may be connected to the determining module 20; and the sending module 40 is used for sending the multimedia message compressed by the compressing module according to the maximum size of the multimedia message supported by the called terminal, and the sending module may be connected to the compressing module 30.

Wherein the compressing module 30 comprises a splitting module, a compressing sub-module and an assembling module, wherein the splitting module is used for dividing the received contents of the multimedia message into different types of multimedia message content segments according to a multimedia type, wherein the multimedia type includes pictures, audios, videos and texts; the compressing sub-module is used for compressing the different types of the multimedia message content segments respectively; and the assembling module is used for assembling the individual compressed multimedia message content segments into the compressed multimedia message.

Wherein the sending module 40 comprises a first sending module and a second sending module, wherein the first sending module is used for directly sending the compressed multimedia message if the size of the compressed multimedia message is smaller than or equal to the maximum size of the multimedia message supported by the called terminal; and the second sending module is used for dividing the compressed multimedia message into multiple sub-multimedia-messages and sending them if the size of the compressed multimedia message is greater than the maximum size of the multimedia message supported by the called terminal, wherein the size of each sub-multimedia-message is all smaller than or equal to the maximum size of the multimedia message supported by the called terminal.

Based on the content adaptation server provided in the embodiments of the present invention, the presentation effect of the contents of the multimedia message can be enhanced and the user experience can be improved by selecting the optimum multimedia format to compress the multimedia message according to the model of the called terminal.

As mentioned above, in accordance with the method for realizing content adaptation and the content adaptation server provided in the present invention, can enhance the presentation effect of the contents of the multimedia message can be enhanced and the user experience can be improved by selecting the optimum multimedia format to compress the multimedia message according to the model of the called terminal.

Moreover, the implementation of the present invention has not changed the system architecture and the existing processing flow, therefore it is easy to be implemented and promoted in the technical field, and offers a strong industrial applicability.

The above descriptions are only exemplary embodiments of the present invention, rather than limit the present invention; as to those technicians skilled in the art, various modifications and changes can be made to the present invention. Any modification, equivalent substitute and improvement within spirit and principle of the present invention are in protection scope of the present invention.

What is claimed is:

1. A method for realizing content adaptation, including:
   receiving a multimedia message from a calling terminal, wherein contents of the multimedia message and a model of a called terminal are included in the multimedia message, the calling terminal having included the model of the called terminal into the multimedia message;
   determining multimedia formats supported by the called terminal according to the model of the called terminal, and selecting an optimum multimedia format from them; and
   compressing the multimedia message according to the selected optimum multimedia format, and sending the compressed multimedia message according to the maximum size of the multimedia message supported by the called terminal.

2. The method according to claim 1, wherein the process of compressing the multimedia message specifically includes:
   according to a multimedia type, the received contents of the multimedia message are divided into different types of multimedia message content segments, wherein the multimedia type includes pictures, audios, videos and texts; and
   different types of the multimedia message content segments are compressed respectively, and individual compressed multimedia message content segments are assembled into the compressed multimedia message.

3. The method according to claim 1, wherein the process of sending the compressed multimedia message according to the maximum size of the multimedia message supported by the called terminal specifically includes:
   if the size of the compressed multimedia message is smaller than or equal to the maximum size of the multimedia message supported by the called terminal, then the compressed multimedia message is sent directly; and
   if the size of the compressed multimedia message is greater than the maximum size of the multimedia message supported by the called terminal, then the compressed multimedia message is divided into multiple sub-multimedia-messages, wherein the size of each sub-multimedia-message is all smaller than or equal to the maximum size of the multimedia message supported by the called terminal.

4. The method according to claim 1, further including:
   a multimedia message center receiving the compressed multimedia message;
   the multimedia message center decomposing the compressed multimedia message;
   in the case that one multimedia message is obtained through decomposition, the multimedia message center directly sending the multimedia message obtained through decomposition to the called terminal; and
   in the case that multiple sub-multimedia-messages are obtained through decomposition, the multimedia message center sending one sub-multimedia-message to the called terminal, and locally saving the rest of the sub-multimedia-messages to be used for subsequent sending.

5. The method according to claim 4, wherein the process of locally saving the rest of the sub-multimedia-messages to be used for subsequent sending specifically includes:
   after receiving a message acknowledgement response from the called terminal, the multimedia message center sends another sub-multimedia-message to the called terminal.

6. A content adaptation server for use with a calling terminal having a model, the calling terminal disposed to include the model of a called terminal into a multimedia message, including:
   a receiving module, which is used for receiving a multimedia message from the calling terminal, wherein multimedia contents and the model of a called terminal are included in the multimedia message;
   a determining module, which is used for determining multimedia formats supported by the called terminal according to the model of the called terminal and selecting an optimum multimedia format from them;
   a compressing module, which is used for compressing the multimedia message according to the optimum multimedia format selected by the determining module; and
   a sending module, which is used for sending the multimedia message compressed by the compressing module according to the maximum size of the multimedia message supported by the called terminal.

7. The content adaptation server according to claim 6, wherein the compressing module comprises:
   a splitting module, which is used for dividing the received contents of the multimedia message into different types of multimedia message content segments according to a multimedia type, wherein the multimedia type includes pictures, audios, videos and texts;
   a compressing sub-module, which is used for compressing the different types of the multimedia message content segments respectively; and
   an assembling module, which is used for assembling individual compressed multimedia message content segments into the compressed multimedia message.

8. The content adaptation server according to claim 6, wherein the sending module comprises:
   a first sending module, which is used for directly sending the compressed multimedia message if the size of the compressed multimedia message is smaller than or equal to the maximum size of the multimedia message supported by the called terminal; and
   a second sending module, which is used for dividing the compressed multimedia message into multiple sub-multimedia-messages and sending them if the size of the compressed multimedia message is greater than the maximum size of the multimedia message supported by the called terminal, wherein the size of each sub-multimedia-message is all smaller than or equal to the maximum size of the multimedia message supported by the called terminal.

9. The method according to claim 2, further including:
   a multimedia message center receiving the compressed multimedia message;
   the multimedia message center decomposing the compressed multimedia message;
   in the case that one multimedia message is obtained through decomposition, the multimedia message center directly sending the multimedia message obtained through decomposition to the called terminal; and in the case that multiple sub-multimedia-messages are obtained through decomposition, the multimedia message center sending one sub-multimedia-message to the called terminal, and locally saving the rest of the sub-multimedia-messages to be used for subsequent sending.

10. The method according to claim 3, further including:

a multimedia message center receiving the compressed multimedia message;

the multimedia message center decomposing the compressed multimedia message;

in the case that one multimedia message is obtained through decomposition, the multimedia message center directly sending the multimedia message obtained through decomposition to the called terminal; and in the case that multiple sub-multimedia-messages are obtained through decomposition, the multimedia message center sending one sub-multimedia-message to the called terminal, and locally saving the rest of the sub-multimedia-messages to be used for subsequent sending.

11. The method according to claim 9, wherein the process of locally saving the rest of the sub-multimedia-messages to be used for subsequent sending specifically includes:

after receiving a message acknowledgement response from the called terminal, the multimedia message center sends another sub-multimedia-message to the called terminal.

12. The method according to claim 10, wherein the process of locally saving the rest of the sub-multimedia-messages to be used for subsequent sending specifically includes:

after receiving a message acknowledgement response from the called terminal, the multimedia message center sends another sub-multimedia-message to the called terminal.

13. The content adaptation server according to claim 7, wherein the sending module comprises:

a first sending module, which is used for directly sending the compressed multimedia message if the size of the compressed multimedia message is smaller than or equal to the maximum size of the multimedia message supported by the called terminal; and a second sending module, which is used for dividing the compressed multimedia message into multiple sub-multimedia-messages and sending them if the size of the compressed multimedia message is greater than the maximum size of the multimedia message supported by the called terminal, wherein the size of each sub-multimedia-message is all smaller than or equal to the maximum size of the multimedia message supported by the called terminal.

* * * * *